United States Patent [19]

Maeda

[11] 4,134,755

[45] Jan. 16, 1979

[54] METHOD FOR REMOVING ZINC TYPE METALS AND COMPOUNDS IN DUST RECOVERY PROCESS IN IRON MANUFACTURE

[76] Inventor: Koichi Maeda, 1-16-23, 603 Zenpukuji, Suginami-Ku, Tokyo, Japan

[21] Appl. No.: 826,972

[22] Filed: Aug. 22, 1977

[30] Foreign Application Priority Data

Aug. 27, 1976 [JP] Japan .................................. 51-101526

[51] Int. Cl.$^2$ .............................................. C22B 7/04
[52] U.S. Cl. ........................................ 75/25; 55/72; 209/211
[58] Field of Search ................ 75/25; 55/72; 209/211; 266/157

[56] References Cited

U.S. PATENT DOCUMENTS

| | | | |
|---|---|---|---|
| 3,063,694 | 11/1962 | Gaw | 266/157 |
| 4,018,680 | 4/1977 | Kupfer | 75/25 |

FOREIGN PATENT DOCUMENTS 2603096  7/1976  Fed. Rep. of Germany ........... 209/211

*Primary Examiner*—M. J. Andrews

[57] ABSTRACT

A process and apparatus for recycling iron material components of dusts discharged from iron manufacturing furnaces such as blast furnaces and converters and removing zinc type metals and compounds from such dusts to avoid their deposition and accumulation on the furnace walls. A welt method is employed for separating the iron dust components from the zinc and removing these zinc type metals and compounds. The zinc material is made identifiable or "earmarked" from the iron material by being selectively ground or otherwise reduced to finer particles than the iron material, the zinc material then being removed from the iron material by wet separation under negative pressures for reclamation or disposal. The iron material remaining is processed for recycling into the furnace.

9 Claims, 1 Drawing Figure

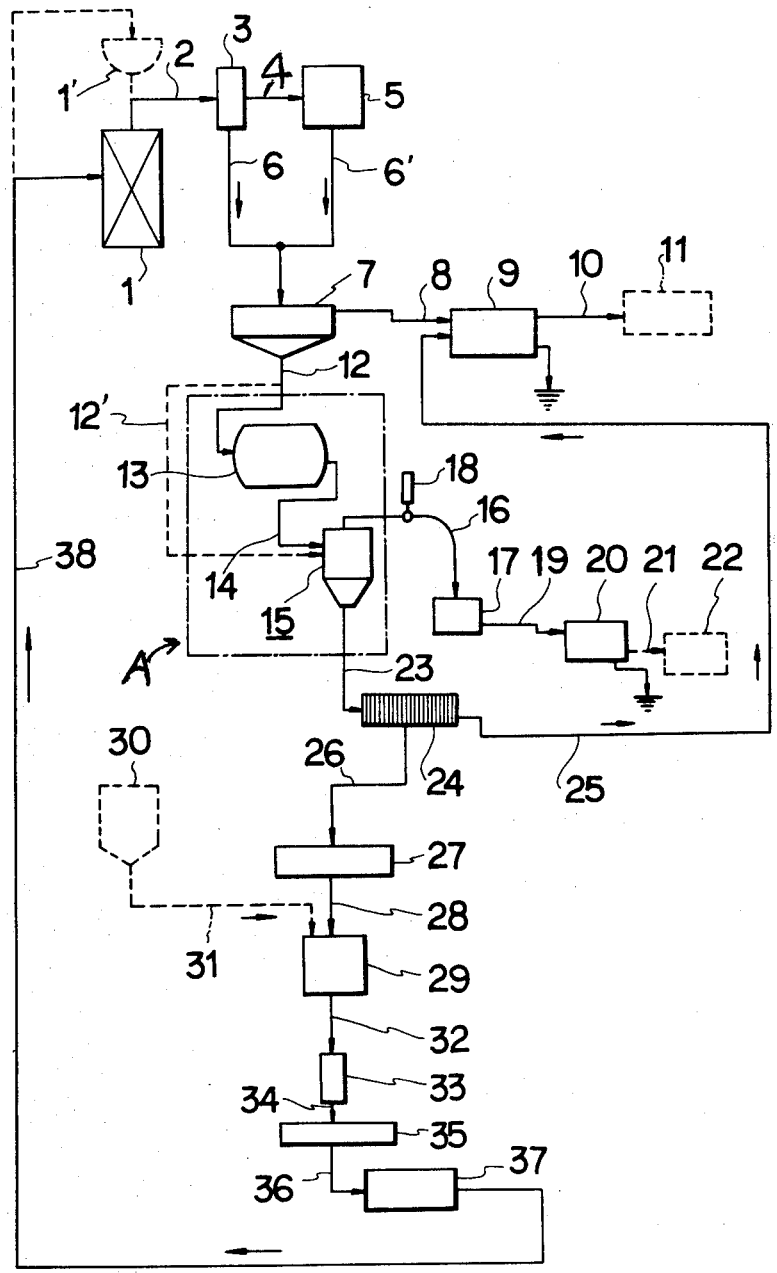

METHOD FOR REMOVING ZINC TYPE METALS AND COMPOUNDS IN DUST RECOVERY PROCESS IN IRON MANUFACTURE

BACKGROUND OF THE INVENTION

This invention relates to dust recovery in iron manufacture and more particularly to a method and apparatus for separating zinc type material from iron material in such dust and removing the zinc type material, with the iron material being recycled into the manufacturing process.

In order to maintain good working conditions and prevent environmental pollution, in iron manufacturing furnaces such as blast furnaces, converters and electric furnaces, the dusts discharged from these furnaces are forcibly collected so as to avoid pollution of the air. Further, for the purpose of more effectively utilizing resources, iron-containing components are purified and recycled into the iron manufacturing furnaces, for example, after pelletization. These dust removing and recycling techniques are now broadly employed in the art of iron manufacture.

Dust collected in the above recycle process contain Zn, ZnO, Pb and the like (called "zinc type metals and compounds" in the instant specification and claims) in addition to $Fe_2O_3$ and like iron compounds.

Accordingly, when these collected dusts are recycled repeatedly into iron manufacturing furnaces, such zinc type metals and compounds are accumulated and adhere to furnace walls and flues to cause clogging in furnace bricks thereby reducing the operation efficiency drastically. Moreover, there is the danger that these accumulated zinc type metals and compounds will deposit on the refractory materials of the furnace, thereby shortening the effective life of the furnace. In addition to these shortcomings, the accumulation of such zinc type material on the furnace tends to lower the grade of the raw steel produced.

As means for overcoming these defects and disadvantages, a method has been proposed in which recovered dusts are dipped in a dissolution tank and decomposed in several stages by chemically dissolving means such as a leaching process. However, this method has the disadvantages that the equipment involved is complicated, the operating cost is high, a considerable space is required and the operating maintenance requires very high technical capability.

Application of flotation dressing means to recovered dusts can also be employed, but conditions for operation in a high magnetic field in a magnetic dressing machine are very critical and this method does not lend itself for use in a practical operating situation.

SUMMARY OF THE INVENTION

It is a primary object of the present invention to provide a method in which the foregoing problems involved in the dust recovery process in an iron manufacturing furnace are solved and defects, difficulties and disadvantages of the prior art techniques are eliminated or ameliorated.

Another object of the present invention is to provide a method for removing zinc type metals and compounds in the dust recovery process in the iron manufacture in which zinc type metals and compounds can easily be removed at low costs by subjecting them to processing whereby they can be identified by particle size and removed by negative pressure separation whereby resources can be utilized at high efficiency.

Still another object of the present invention is to provide a mechanism to be used directly for practising the above method for removing zinc type metals and compounds.

In accordance with the present invention, the foregoing objects can be attained by a method comprising concentrating by a thickener or the like dusts discharged from a blast furnace, an electric furnace or the like. Such dusts are preliminarily collected by electric dust precipitation or the like and secondarily collected by wet dust collection by a venturi scrubber or the like. The dust so collected is fed to the thickener where solid-liquid separation is accomplished. The overflow liquid in the thickener is appropriately transferred to a waste water treatment device for re-utilization while the underflowed concentrate is subjected to solid-liquid separation by dehydration means such as a filter pass.

Selective pulverization according to the work index is accomplished by a grinding mill or the like which receives the output of the thickener and operates to pulverize zinc type metals and components as finely as possible so as to identify or "earmark" the zinc particles from the iron particles by size. When the dust particles are slime coated in the thickener, a line mixer is employed in place of the grinder to agitate the particles so as to prevent re-cohesion thereof. Sorting and grinding of the particles by the grinder may be omitted when the particles are "size-earmarked" by pipe flowing or pumping during the transportation process.

The size-earmarked particles are separated into zinc type metals and compounds and iron-containing components by means of a negative pressure wet classifying process using a negative pressure type wet cyclone or the like. The zinc type metals and compounds are either discarded or appropriately retreated. The iron-containing components are subjected to dehydration and solid-liquid separation, the resulting cake being dried and mixed with other dry material. Means are provided for agitating, granulating, calcining and sintering the mixture so as to form reduced iron pellets which are recycled to the blast furnace, converter or electric furnace. Accordingly, the method of the present invention is characterized in that deposition and adhesion of recycled zinc type metals and compounds in the apparatus of the blast furnace, converter or electric furnace can be prevented and such difficulties as the falling off and peeling of the zinc type metals and compounds from the furnace walls are prevented. Further deterioration of the grade of the raw steels produced is avoided, the life of the furnace can be prolonged, and resources can be utilized more effectively and efficiently.

BRIEF DESCRIPTION OF THE DRAWING

The drawing is a flow sheet illustrating one embodiment of the present invention.

DETAILED DESCRIPTION OF THE PREFERRED EMBODIMENTS

An ordinary blast furnace 1 as the iron manufacturing furnace is connected to a known electric dust precipitator 3 as the primary dust collector through an exhaust gas duct 2. When the iron manufacturing furnace is a converter or electric furnace 1', it also is connected in a similar manner.

The electric dust precipitator 3 is connected to a wet venturi scrubber 5 as the secondary dust collector through a dust collecting duct 4, and the electric dust precipitator 3 and the wet venturi scrubber 5 are appropriately connected to a thickener 7 through dust collecting ducts 6 and 6'.

An overflow pipe 8 from the thickener 7 is appropriately connected to a waste water treatment apparatus 9 which is then connected to a re-treatment apparatus 11 through a transporting and connecting pipe 10.

A mechanism A for removing zinc type metals and compounds is connected to an underflow pipe 12 of the thickener 7. Mechanism A includes a grinding mill 13 such as a vortex mixer which receives the output of underflow pipe 12 and operates to effect selective pulverization of concentrated dusts, namely the iron and zinc-containing components, which are treated according to the work index of their toughness and brittleness. The softer zinc components are thus ground into finer particles than the iron. A discharge opening (not shown) of grinding mill 13 is connected to a feed inlet of a negative pressure type wet cyclone 15 through a discharge pipe 14.

When the iron and zinc particles of the collected dusts in the thickener already made to have different particle sizes, as described hereinafter, by pipe flowing or pumping during the transportation process, the underflow pipe 12 is directly connected to the negative pressure cyclone 15 through a second underflow pipe 12'.

In situations where the dusts are slime-coated in the thickener 7, a line mixer or the like is employed in place of the grinding mill 13 so as to prevent re-cohesion of dust particles, the output of the line mixer being connected to the feed opening of the negative pressure cyclone 15.

An overflow sucking finder pipe 16 of the negative pressure type wet cyclone 15 is run to a seal tank 17 of a water tank and is downwardly extended so that a water column is formed therein, whereby a negative pressure siphon tube is formed. A siphon regulator 18 capable of pressure adjustment is disposed on top of the finder pipe 16.

The seal tank 17 is connected to an appropriate waste water treatment apparatus 20 through a connecting pipe 19 and the waste treatment apparatus 20 is connected to a retreatment apparatus 22 for zinc type metals and compounds through a connecting pipe 21.

An underflow pipe 23 of the negative pressure type cyclone 15 is connected to a filter press 24 for solid-liquid separation through an appropriate regulator (not shown), and a waste water pipe 25 from the filter press 24 is used to connect the waste water treatment apparatus 9 to the thickener 7.

A transportation conveyor 26 connected to filter press 24 is connected to an appropriate drying apparatus 27, and a transportation conveyor 28 from the drying apparatus 27 runs to an appropriate agitating and mixing apparatus 29 such as a pan type mixer.

A conveyor 31 from a dry fine powder hopper 30 for starting ores or the like may be connected to the agitating and mixing apparatus 29 as may be necessary.

An appropriate granulating apparatus 33 is connected to the agitating and mixing apparatus 29 through a transportation conveyor 32, and the granulation apparatus 33 is connected to a calcination apparatus 35 through a transportation conveyor 34 and to a sintering apparatus 37 as the final treatment apparatus through a transportation conveyor 36. The sintering apparatus 37 is connected by means of a transportation conveyor 38 to blast furnace 1 or converter 1'.

In the system having the above structure, when the blast furnace 1 or the converter or electric furnace 1' is operated and the electric dust precipitator 3 and the wet venturi scrubber 5 are operated, exhaust dusts from the blast furnace 1 or the converter or electric furnace 1', which contain ZnO, Zn, $Fe_2O_3$ and the like are first collected in the form of coarse particles by the electric dust precipitator 3, and then collected in the form of fine particles by the wet venturi scrubber 5. The solid dust portion is gathered in the thickener 7 by means of the dust collecting ducts 6 and 6' and undergoes solid-liquid separation and sedimentation actions, and the overflowed portion is transferred to the waste water treatment apparatus 9 via overflow pipe 8. Any remaining solid dust portion is fed by means of pipe 10 to the retreatment apparatus 11 for an appropriate subsequent treatment.

A spigot of the thickener 7 for the precipitated and concentrated underflowed (solid dust) portion is connected by means of an underflow pipe 12 to the grinding mill 13 of the mechanism A for removal of zinc type metals and compounds, which is operated in a relay manner. Selective pulverization is conducted by the grinding mill 13 based on the work index of the preliminarily analyzed toughness, brittleness and the like of Pb, Zn, ZnO, and $Fe_2O_3$ of the precipitate so that particle size identification or earmarking is accomplished. This selective pulverization of grinding mill 13 is such that Zn, Pb and Zn components are pulverized as finely as possible, but the $Fe_2O_3$ component is not pulverized. Accordingly, particle size identification of the zinc components from the iron components is clearly achieved by this wet pulverization, and these "size-earmarked" particles are discharged and fed in a mingled condition to a feeder at the feed opening of the negative pressure type wet separator 15.

When the particle size sorting is preliminarily attained in the transportation line to the thickener 7, the dust particles are directly fed to the feed opening of the negative pressure type cyclone 15.

When the dust particles are slime-coated, re-cohesion is appropriately prevented by a line mixer or the like as pointed out hereinbefore, and they are fed to the feeder in the particle size-sorted state.

Since in the negative pressure type wet separator 15 the finder pipe 16 is connected to the seal tank 17 located below to form a siphon pipe, a negative pressure is maintained in the body portion, and by means of the siphon regulator 18, the finder pressure, namely the operation negative pressure, may be controlled to an optimum level.

Accordingly, the solid component fed to the negative pressure wet separator 15 is maintained under a negative pressure condition by suction. Namely, finer particles of Pb, Zn and ZnO are positively sucked more strongly and separated from coarser particles of $Fe_2O_3$ and the like, and they are sedimented and gathered in the water tank 17 of the seal tank through the overflow pipe 16 and substantially completely together by the effect of the above particle size earmarking.

Coarse particles of the iron-containing components such as $Fe_2O_3$ are discharged intermittently by predetermined amounts from the underflow pipe 23 through the action of the above-mentioned regulator.

Accordingly, in the mechanism A for removing zinc type metals and compounds, not only the wet selective pulverization in the first stage and the pulverizing particle size "earmarking", but also the positive sucking separation of fine particles by the negative pressure type wet separation in the second state are accomplished. Therefore, the solid portion discharged from the underflow pipe 23 has a much reduced content of zinc type metals and compounds and the iron-containing components occupy a substantial portion of this solid portion.

Test data taken for an operative embodiment of the above-described mechanism A for removing zinc type metals and compounds employing a negative pressure type wet separator, is shown in the following table.

Table

|  | Test No. | | |
| --- | --- | --- | --- |
|  | 1 | 2 | 3 |
| Finder pipe diameter (mm) | 22 | 22 | 22 |
| Feed Pressure (kg/cm$^2$) | 0.5 | 0.5 | 0.5 |
| Syphon pipe pressure (-mmHg) | 50 | 150 | 100 |
| Overflowed portion | | | |
| Flow rate (l/min) | 57.2 | 60.0 | 60.0 |
| Concentration (%) | 7.63 | 7.2 | 9.09 |
| Specific gravity of liquid | 1.0535 | 1.0504 | 1.0645 |
| Solid distribution ratio (%) | 26.3 | 30.2 | 36.2 |
| Zn distribution ratio (%) | 80.6 | 89.5 | 85.7 |
| Fe distribution ratio (%) | 20.0 | 31.3 | 33.9 |
| Underflowed portion | | | |
| Flow rate (l/min) | 9.8 | 7.7 | 7.4 |
| Concentration (%) | 70.00 | 71.34 | 71.83 |
| Specific gravity of liquid | 1.875 | 1.907 | 1.9188 |
| Solid distribution ratio (%) | 73.7 | 69.8 | 63.8 |
| Zn distribution ratio (%) | 19.4 | 10.5 | 14.2 |
| Fe distribution ratio (%) | 80.0 | 68.7 | 66.1 |
| Feed | | | |
| Flow rate (l/min) | 67.0 | 67.7 | 66.0 |
| Concentration (%) | 22.0 | 20.0 | 21.0 |
| Specific gravity of liquid | 1.17 | 1.155 | 1.164 |
| Solid feed rate (Kg/min) | 17.46 | 15.01 | 16.01 |
| Zn level (%) | 2.35 | 2.90 | 2.66 |

As will be apparent from the foregoing data, if appropriate conditions are provided, the zinc and iron particles can be earmarked fine and coarse respectively and effectively separated into the overflowed portion of Zn components and the underflowed portion of predominantly iron-containing components depending on the specific gravity and solid content of the liquid, such that they can be separately collected.

Zinc type metals and compounds thus agglomerated and gathered in the seal tank 17 through the overflow pipe 16 are transferred to the waste water treatment apparatus 20 through the transfer pipe 19 and subjected to the solid-liquid separation. Solid zinc metals and compounds are treated in the treatment apparatus 22 so that they can be utilized again.

Zinc-free iron-containing components discharged from the underflow pipe 23 are fed to the filter press 24 where solid-liquid separation is performed. The liquid is fed to the waste water treatment apparatus 9 through the waste water pipe 25, where the liquid is appropriately treated. The solid material in treatment apparatus 9 is fed to the retreatment apparatus 11 so that it can be re-treated, as pointed out hereinbefore.

The iron-containing components which have been subjected to solid-liquid separation in filter press 24 are transferred to the drying apparatus 27 by the transportation conveyor 26 after opening of the filter press 24, and they are appropriately dried. Then, they are fed to the agitating and mixing apparatus 29 by the transportation conveyor 28 where they are subjected to the mixing and kneading operation. In some cases, they are mixed and kneaded with fine powder of a raw material to form a homogeneous mixture. Then, the mixture is fed to the granulation apparatus 33 by the conveyor 32 and formed into granules having an appropriate size. The granules are then fed to the calcining apparatus 35 by the transportation conveyor 34 where they are calcined and shaped. The calcined and shaped product is then fed to the sintering apparatus 37 through the transportation conveyor 36 where it is pelletized. The pellets are recycled for reduction in the blast furnace 1 or converter or electric furnace 1'.

As will be apparent from the foregoing illustration, the above-mentioned dust recycle reduction process is conducted repeatedly, and therefore, zinc type metals and compounds are gradually removed in the course of the repeated recycle reduction process such that adhesion, deposition or accumulation of zinc type metals and compounds on the walls of the blast furnace 1 or the converter or electric furnace 1' is avoided. Accordingly, special shut-down operations need not be conducted for removing deposited substances, and the iron manufacturing operation can be performed continuously at a high efficiency. Further, the life of the furnace can be prolonged.

As detailed hereinbefore, according to the present invention, since dusts discharged from an iron-manufacturing furnace are concentrated and then subjected to wet type preferential pulverization according to the work index to effect particle size earmarking, or since dusts which have undergone particle size earmarking during the transportation process are treated, only zinc type metals and compounds are selectively pulverized as finely as possible according to the work index of toughness, brittleness or the like. Iron-containing components are not pulverized, but rather left in the form of coarse particles, without performing such pulverization. Thus, there is attained an advantage in that a suitable basic condition for removal of zinc type metals and compounds can be realized.

After the above selective pulverization of the particle size-earmarking attained in the transportation process, dust particles are subjected to negative pressure wet separation. In this operation, the solid component in which the above basic condition for removal of zinc type metals and compounds has been established by the particle size-earmarking, the fine and coarse particles are separated from each other. Further, since a compressed pressure feed system is not employed but rather the negative pressure operating system of the present invention is adopted, fine particles can be sucked out effectively by virtue of the wet separation and simultaneously there is attained an effect such that coarse particles having a large specific gravity can be efficiently separated by sedimentation. Accordingly, zinc type metals and compounds rendered finer in the selective pulverization step can be efficiently separated from the iron-containing components and selectively removed from the solid. For example, a separation ratio of 80%, that cannot be attained by the conventional chemical treatment process or flotation dressing process, can be attained by means of the present invention.

Further, by using as the treating mechanisms a grinding mill for the selective pulverization and a negative pressure type wet cyclone for the negative pressure type wet separation, these operations can be accomplished efficiently by means of simple structures. In view of the structural characteristics of the grinding mill and negative pressure wet cyclone, the operations can be greatly facilitated, and there is attained an advantage that the operating maintenance is made easy and the operating and initial cost can be significantly reduced.

Moreover, the refining recycle process of dusts from iron manufacturing furnaces can be accomplished at high purification ratio and at a low cost, and there is attained a subsidiary advantage in that zinc type metals and compounds can be effectively removed and also subjected to retreatment. Still further, in a blast furnace or a converter, zinc type metals and compounds are gradually removed from recycled dusts, and therefore, the adherence or deposition of zinc type metals and compounds on the wall of the blast furnace or converter is avoided. Therefore, the danger of the peeling and falling off of deposited zinc type metals and compounds or refractory materials from the furnace walls is minimized. Moreover, maintenance operations need not be performed for positively peeling off such deposited substances.

Still in addition, since zinc type metals and compounds are removed from the recycle process, the degree of purification is enhanced in the iron manufacturing process, and there is attained another advantage in that the quality of the steel end product can be improved.

While the device of this invention is described and illustrated in detail, it is to be clearly understood that this is intended by way of illustration and example only and is not to be taken by way of limitation, the spirit and scope of this invention being limited only by the terms of the following claims.

I claim:

1. A method for wet removal of zinc type metals and compounds in a process for purifying and recovering dusts collected in an iron manufacturing furnace, which comprises the steps of:
   wet-concentrating dusts containing particles of iron and zinc type material collected from the iron manufacturing furnace,
   pulverizing the particles of zinc material so the zinc particles are substantially finer than the iron particles, thereby earmarking the zinc and iron by particle size,
   feeding the wet concentrated and size earmarked dusts together,
   separating and removing the zinc type metals and compounds from iron-containing components in the dusts by wet separation conducted under a negative pressure,
   processing the iron containing components to form solid iron pieces, and
   recycling the iron pieces to the iron manufacturing furnace.

2. the method of claim 1 wherein the dusts are wet concentrated by means of a thickener.

3. The method of claim 1 wherein the dust particles are slime coated during wet concentration and after this last mentioned step are agitated to prevent re-cohesion thereof.

4. The method of claim 1 wherein the particles of zinc type material are selectively pulverized by means of a grinder.

5. The method of claim 1 wherein the wet concentration of the dusts is accomplished by solid-liquid separation in a thickener.

6. The method of claim 1 wherein the dusts are collected from the furnace for wet concentration in an electric dust precipitator and the dust from the precipitator fed to a wet venturi scrubber for wet dust collection.

7. The method of claim 1 wherein the wet separation of the zinc type metals and iron-containing components is accomplished by means of a negative pressure type wet cyclone.

8. The method of claim 1 wherein prior to recycling the iron-containing components to the furnace, said components are processed to form iron pellets.

9. The method of claim 8 wherein the iron pellets are formed by separating the solid and liquid parts of said iron-containing components from each other in a filter press, drying the solid parts, agitating the solid parts to form a homogeneous mass, forming said mass into granules, calcining and shaping the granules and sintering the calcined and shaped granules to form the pellets.

* * * * *